United States Patent [19]

Reichenberger

[11] 4,078,628
[45] Mar. 14, 1978

[54] DOUBLE-WHEEL AUTOMOTIVE HAND CONTROL SYSTEM

[75] Inventor: Anton J. Reichenberger, New York, N.Y.

[73] Assignee: The United States of America as represented by the Department of Health, Education and Welfare, Washington, D.C.

[21] Appl. No.: 714,685

[22] Filed: Aug. 16, 1976

[51] Int. Cl.² .............................................. B60K 41/20
[52] U.S. Cl. ..................................... 180/77 R; 74/486
[58] Field of Search ............. 180/77 H, 77 HT, 77 R, 180/19 H; 74/471 R, 478, 491, 484 R, 486

[56] References Cited

U.S. PATENT DOCUMENTS

| 1,503,938 | 8/1924 | Davis | 74/486 |
|---|---|---|---|
| 1,519,172 | 12/1924 | Stewart | 74/486 |
| 2,176,170 | 10/1939 | Flowers | 180/77 H |
| 2,471,244 | 5/1949 | Self | 74/486 X |
| 2,602,348 | 7/1952 | Wilson | 74/484 |
| 2,824,462 | 2/1958 | Nelles | 74/484 |
| 2,875,638 | 3/1959 | Sell | 74/484 |
| 3,275,093 | 9/1966 | Pawl | 74/471 X |
| 3,373,628 | 3/1968 | Lake | 74/484 |

Primary Examiner—Joseph F. Peters, Jr.
Assistant Examiner—R. Schrecengost
Attorney, Agent, or Firm—Holman & Stern

[57] ABSTRACT

Disclosed is an automotive control system for use by handicapped drivers who have lost the functional mobility of the lower extremities. A second wheel concentric with the steering wheel is added such that it is reachable by either the thumb or fingertips when hands are on a steering wheel in normal driving fashion. Movement of this second control wheel in a direction away from the driver actuates the automotive braking system through an electro-hydraulic servo system. Pulling the second wheel towards the driver actuates the throttle of the automobile through a similar servo system. The brake and throttle servos interface with existing automotive control systems such that little additional "add on" mechanisms are necessary.

9 Claims, 1 Drawing Figure

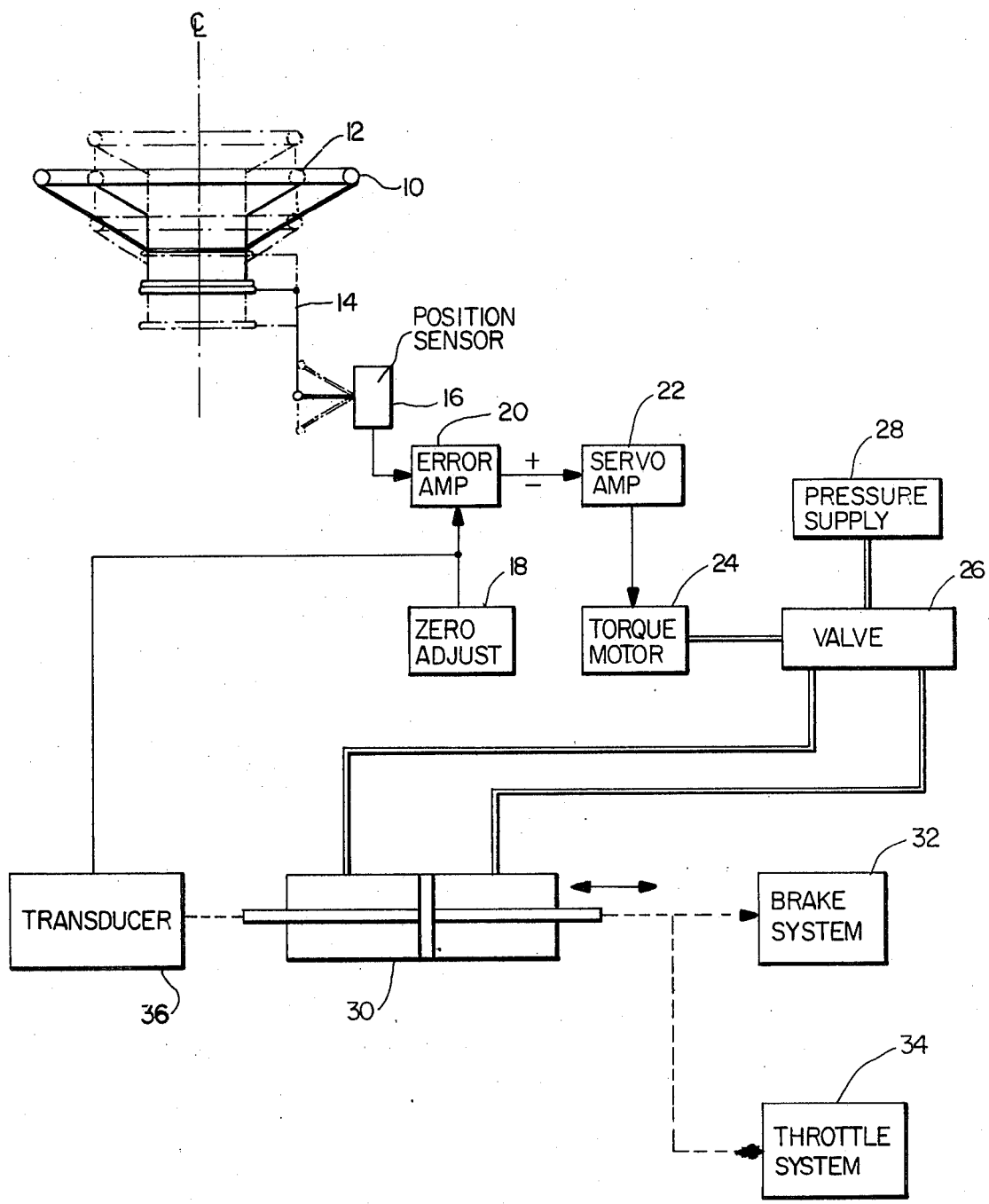

DOUBLE-WHEEL AUTOMOTIVE HAND CONTROL SYSTEM

BACKGROUND OF THE INVENTION

The present invention relates to mechanisms for the control of automotive brake and acceleration systems by handicapped drivers without the use of lower extremities.

Prior art control systems to allow handicapped drivers to easily and safely operate automobiles are bulky complicated mechanical linkages which are "add on" systems. Most of the systems required a substantial amount of energy to actuate brake pedal through the purely mechanical levers normally used. Additionally, to steer the car while braking or accelerating many times requires full use of both hands, having one on the steering wheel and one on the accelerate-decelerate lever — eliminating any possibility a handicapped person operating an automobile with only one arm or only partial mobility in both hands.

Furthermore, prior mechanical lever "add on" systems normally utilize a portion of the already limited leg room in present passenger automobiles to connect the hand operated levers to the brake and accelerator pedals that further obstruct entrance to and exit from a motor vehicle by a handicapped person.

SUMMARY OF THE INVENTION

It is therefore an object of the present invention to provide an automotive brake-accelerator control system for use by handicapped drivers with the use of only one hand.

A further object of the present invention is to provide an automotive hand control system which is an integral part when installed in the motor vehicle which does not further restrict the driver's leg room.

A still further object of the present invention is to provide an automotive hand control system utilizing the automobile's servo system to reduce the level of force required to actuate brake/accelerator controls below that achievable through purely mechanical levers of conventional "add on" systems.

These and other objects are achieved by providing a second wheel concentrically mounted inside the steering wheel of an automobile and connected to a control station which senses the position of the plane of the control wheel versus the plane of the automobile steering wheel. This position command is amplified by a servo amplifier whose output is connected to a torque motor which ultimately controls the position of a linear actuator. Movement in one direction of the linear actuator applies pressure to the brake control system and movement in the other direction increases the throttle setting of the engine. Thus, by moving the control wheel in or out with only thumb or fingertip pressure, a handicapped individual can easily control a full size automobile.

BRIEF DESCRIPTION OF THE DRAWINGS

A more complete appreciation of the invention and many of the attendent advantages thereof will be readily apparent by reference to the following detailed description of a preferred embodiment when considered in connection with the accompanying drawing wherein a schematic representational view of one embodiment of the present invention is illustrated.

DETAILED DESCRIPTION OF THE PREFERRED EMBODIMENT

A conventional steering wheel 10 is shown with a hand control wheel 12 concentrically mounted therein. Control wheel 12 is mounted such that it is free to move in and out along the axis of the steering wheel 10 through any known mechanism (not shown). The location of control wheel 12 is sensed through linkage 14 by position sensors 16. The position sensor develops an electrical signal which is compared to a zero signal from zero adjust 18 in error amplifier 20 and provides a positive or negative signal to servo amplifier 22 whose magnitude is determined by the position of control wheel 12 away from a pre-set zero position. Such deviations from a zero position (in the plane of the steering wheel 10) are shown by dotted outlines of control wheel 12. The servo amplifier 22 amplifies the error signal and controls the operation of torque motor 24 which mechanically adjusts valve 26. Valve 26 selectively applies fluid pressure from supply 28 to one side or the other of linear actuator 30, which side depending upon whether the error signal is positive or negative.

Linear actuator 30 is mechanically connected to the existing automotive brake system 32 and/or the throttle system 34 such that when it moves to the right it causes the brake system in the automobile to be actuated slowing the vehicle. The extent to which the brakes are actuated is dependent upon the amount of movement to the right provided by the linear actuator 30. Similarly, if the actuator moves to the left past its neutral point, the throttle system 34 is actuated such that the engine runs at a higher power setting allowing the car to travel at a faster rate of speed. A position transducer 36 maybe connected as shown to balance the signal from position sensor 16 when the throttle or brake system has advanced in accordance with the initial control input.

Thus, while sitting in a normal driving position behind the steering wheel 10 of an automobile equipped with the present invention, a handicapped person would be able to control acceleration or deceleration with a small fingertip movement. A one armed individual, in fact, could safely control an automobile applying brakes or throttle while turning the wheel at the same time because no preset hand position is necessary in order to engage both the steering wheel 10 and the control wheel 12. The only apparatus necessary in the driver's compartment of a conventional automobile is the mounting of the control wheel 12 on the steering column inside steering wheel 10, thus eliminating the cumbersome levers and linkages required in previous manual control systems. Furthermore, a two-stage amplification system is utilized to eliminate driver fatigue in having to maintain a constant forward or backward pressure on the control column while driving for extended periods of time. This dual amplification system further eliminates the requirement of great strength in the event that only one useful limb is available for operation of the steering wheel as would be required with conventional steering systems.

While one embodiment of the present invention has been directed towards an electro-hydraulic control system for automobiles, it is not so limited and those of ordinary skill in the art will envision many modifications and variations in view of the invention hereinbefore described. For example, a fluidic sensor, amplifier, and actuator system could be utilized to provide the same benefit without the necessity of electrical control amplifiers, motors, etc. Therefore, the invention is limited only by the claims appended hereto.

The embodiments of the invention in which an exclusive property or privilege is claimed are as follows:

1. A hand control system for permitting an operator to control the brake control and throttle control systems of an automobile without requiring movement of the operator's hand from a conventionally mounted steering wheel in said automobile, said control system comprising:
   hand control means, operable in response to said operator with said hand remaining on said steering wheel, for generating an electronic error signal; and
   amplifier means for selectively actuating said brake control system and said throttle control system in response to said error signal generated by said control means.

2. The apparatus of claim 1 wherein said amplifier means comprises:
   actuator means for actuating said brake control system and said throttle control system; and
   servo means, responsive to said control means, for amplifying said error signal and providing a control force to said actuator means.

3. The apparatus of claim 2 wherein said servo means comprises:
   a servo amplifier, responsive to said error signal, for generating an amplified error signal;
   a torque motor, responsive to said amplified error signal from said servo amplifier, for providing a mechanical displacement proportional to said error signal;
   pressure means for supplying fluid under pressure; and valve means, responsive to said torque motor, for selectively applying said fluid pressure in said pressure supply means to said actuator means.

4. The apparatus of claim 1 wherein said control means comprises:
   hand actuated control means, responsive to said operator, for changing position;
   position sensor means for sensing the position of said hand actuated control means and for providing an electrical output indicative thereof;
   zero means for providing a constant signal indicative of a predetermined neutral position of said hand actuated control means; and
   error amplifier means, responsive to said zero means and said position sensor means, for generating an error signal indicative of said hand control means position.

5. The apparatus of claim 3 wherein said control means comprises:
   hand actuated control means, responsive to said operator, for changing position;
   position sensor means for sensing the position of said hand actuated control means and for providing an electrical output indicative thereof;
   zero means for providing a constant signal indicative of a predetermined neutral position of said hand actuated control means; and
   error amplifier means, responsive to said zero means and said position sensor means, for generating an error signal indicative of said hand actuated control means position.

6. The apparatus of claim 5 wherein said hand actuated control means comprises:
   a control wheel having an axis of rotation located along the conventionally mounted steering wheel axis of rotation and adjustably movable there along; and
   linkage means for mechanically connecting said hand actuated control wheel to said position sensor means.

7. The apparatus of claim 6 wherein said hand actuated control wheel is concentrically mounted within said conventionally mounted steering wheel and is movable along said axis of rotation in response to said operator applying fingertip pressure.

8. The apparatus of claim 1 wherein said system further comprises transducer means responsive to said amplifier means, for providing a negative feedback signal proportional to the actuation of said brake control system and said throttle control system for reducing said error signal in said control means.

9. The apparatus of claim 8 wherein said transducer means is comprised of a transducer mechanically connected to said actuator means providing feedback to said error amplifier.

* * * * *